Aug. 9, 1938.     B. C. GARDNER     2,125,910
VACUUM VALVE
Filed Aug. 18, 1936
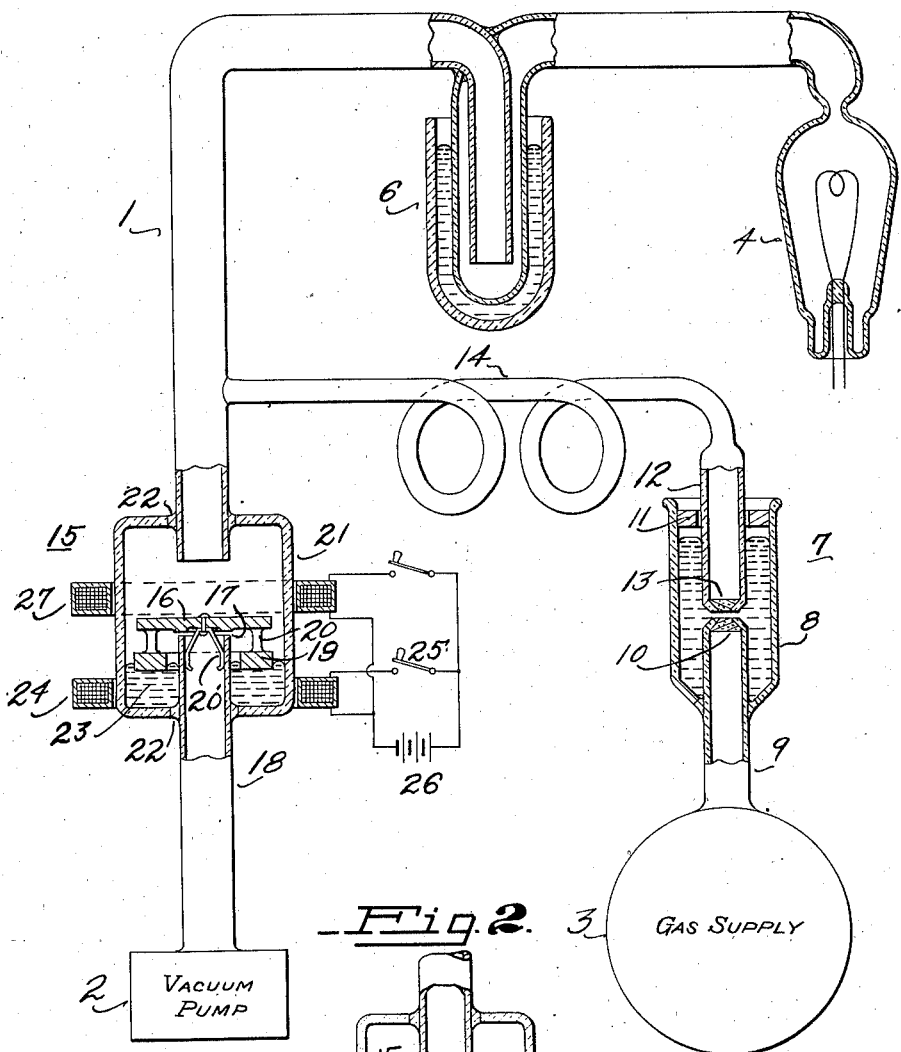
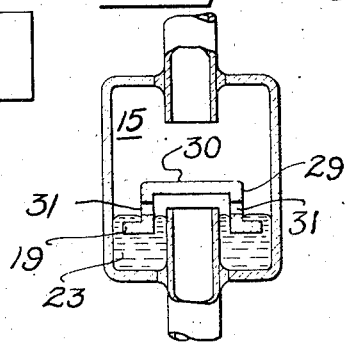
INVENTOR.
BERNARD C. GARDNER
BY
Lippincott & Metcalf
ATTORNEYS.

Patented Aug. 9, 1938

2,125,910

UNITED STATES PATENT OFFICE 2,125,910

VACUUM VALVE

Bernard C. Gardner, Philadelphia, Pa., assignor to Farnsworth Television Incorporated, San Francisco, Calif., a corporation of California Application August 18, 1936, Serial No. 96,611

2 Claims. (Cl. 137—139)

This invention relates to apparatus for treating tubes or glass bulbs with gas, and more particularly to efficient means for controlling the operations of removing air from the tubes and substituting the desired gas prior to treatment therewith.

Apparatus of this character customarily employs a source of high vacuum for removing all gas from the bulb and a source of a selected gas which is used to fill the tube after the air is removed. These sources may be connected to a pump line through valves or stopcocks which must be in open and closed relation at any time, i. e., the vacuum producing apparatus must be inoperative when the gas supply is effective, and vice versa. The effective valves heretofore used have caused considerable annoyance due to the fact that they are usually of the ground glass stopcock variety which must be packed with grease at frequent intervals to maintain their effectiveness and to the fact that such grease leaks into the filling system and the vapors therefrom which enter the tube are subsequently detrimental to operation and life.

It is the principal object of my invention to provide an apparatus of the above indicated character which is completely sealed from the atmosphere without employment of grease packings or the like.

It is a further object to provide a valve for use in such an apparatus the moving parts of which are entirely sealed within the evacuating system.

Further objects and advantages will become clear to those skilled in the art upon reference to the following specification in which reference is made to the accompanying drawing of a preferred embodiment of my invention and in which:

Figure 1 is an elevational view, partially in section, indicating schematically the arrangement of the components of my vacuum valve.

Figure 2 is a sectional view of an alternative form of the electric valve component of Figure 1.

Figure 1 illustrates a filling and evacuating apparatus comprising a hollow glass conduit 1 having connected thereto a source of high vacuum such as a mercury vacuum pump 2 and a source of filling gas such as a tank 3. The tube 4 to be evacuated and filled is fused to the conduit during the evacuation and filling. Interposed in a horizontal section of the conduit 1 is a liquid air trap 6.

The filling gas from tank 3 is admitted to conduit 1 under control of a diffusion valve 7, which in the form illustrated comprises a vertically disposed cylinder 8 containing mercury or the like. Gas supply conduit 9 terminates within the body of mercury and the latter is prevented from entering the conduit by a porcelain filter disk 10 which closes the upper end of conduit 9. Disposed for reciprocation in guide 11 in cylinder 8 is a second conduit section 12 similarly provided with a porcelain filter disk closure 13, which also underlies the surface of the mercury and is juxtaposed to disk 10.

The section 12 may be looped as at 14 so that the end 13 thereof may be reciprocated up and down. It is a property of the porcelain filter disks that they will not pass mercury but will pass a gas. By forcing disks 10 and 13 into contact, a free path is provided for the gas to pass into conduit 1.

Between the point of connection of the gas supply to conduit 1 and vacuum pump 2, the conduit is provided with an interposed electric valve 15 which preferably comprises a valve closure plate 16 overlying the valve seat 17 at the end of the vertically disposed section 18 of the conduit. Plate 16 is carried by a float 19, which is preferably a ring of iron, being secured thereto by vertically disposed legs 20. A sealed-in valve and float chamber is formed by a glass envelope 21 received over the respective ends of the conduit 1 and fused thereto as at the ring seals 22. As illustrated, the conduit section 18 projects into the envelope so as to form therewith an annular well for the reception of a body of mercury 23 or the like upon which float 19 rests.

Suitable guide rods 20 secured to valve plate 16 to slide within the conduit 18 insure proper positioning of the valve.

In order to actuate the valve closure 16 into closed position, a solenoid 24 is suitably disposed about the envelope and connected through a suitable switch 25 to a battery 26. A similar solenoid 27 may be provided for the purpose of releasing the valve to open position if the buoyancy of the mercury be insufficient for the purpose.

In operation, a tube 4 to be evacuated is sealed to conduit 1 as indicated, the valves 7 and 15 preferably remaining closed during this step. Valve 15 is then opened and all gas is exhausted from the tube 3 and conduit 1. Valve 15 is then closed by closing switch 25, and gas is admitted to tube 3 under control of valve 7. The tube is then sealed off.

It will be appreciated that by applicant's construction the interior of the tube evacuating system is completely sealed from the atmosphere and no grease packings are necessary since no mechanical connection is required between the valve closure 16 and the solenoid operating means exterior of the envelope 21.

In Figure 2, I have shown an alternative form for the construction of the electric valve 15 of Figure 1. Upon float 19 is supported a cylinder 29 terminated at its upper end by plate 30. Ports 31 disposed through the cylinder walls provide an air passage when the float 19 is raised by actuating solenoid 27. When solenoid 24 is actuated ring 19 is drawn downward, and the ports are closed by the mercury pool 23.

Having described and illustrated a preferred embodiment of my invention in a manner to enable those skilled in the art to make and use the same, it will be apparent that various modifications thereof may be resorted to without departing from its teachings. It is accordingly to be understood that I consider myself entitled to all such modifications and variations as properly lie within the scope of the following claims.

I claim as my invention:

1. A valve structure comprising a glass housing, a glass conduit sealed to said housing and projecting therewithin, a second glass conduit connected to said housing, a body of mercury within said housing, a float of magnetic material resting on said mercury body, a valve closure carried by said float for movement into and out of seating relation to a terminal end of said conduit, guide means secured to said float and disposed to slide within said conduit, and means including a solenoid surrounding said housing for actuating said valve.

2. A valve structure comprising a glass housing, a glass conduit sealed to said housing and projecting therewithin, a second glass conduit connected to said housing, a body of mercury within said housing, a float of magnetic material resting on said mercury body, a valve closure carried by said float and maintained by flotation away from a terminal end of said conduit, a solenoid positioned around said housing and below said float to close said valve when energized, and a second and similar solenoid positioned above said float to open said valve when energized.

BERNARD C. GARDNER.